(12) United States Patent
Arnold et al.

(10) Patent No.: US 8,276,728 B2
(45) Date of Patent: Oct. 2, 2012

(54) CLUTCH UNIT COMPRISING A TORSIONAL VIBRATION DAMPER

(75) Inventors: Johannes Arnold, Achern (DE); Oliver Nohl, Buhlertal (DE); Philippe Schwederle, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/181,946

(22) Filed: Jul. 13, 2011

(65) Prior Publication Data

US 2011/0266110 A1   Nov. 3, 2011

Related U.S. Application Data

(63) Continuation of application No. PCT/DE2009/001806, filed on Dec. 22, 2009.

(30) Foreign Application Priority Data

Jan. 19, 2009   (DE) .......................... 10 2009 005 076

(51) Int. Cl.
  *F16D 25/10*   (2006.01)
  *F16D 21/06*   (2006.01)
  *F16D 3/12*    (2006.01)

(52) U.S. Cl. ............... 192/48.619; 192/48.8; 192/55.61; 192/70.12; 192/70.17; 192/112

(58) Field of Classification Search ............. 192/48.603, 192/48.619, 55.61
See application file for complete search history.

(56) References Cited

U.S. PATENT DOCUMENTS

| 5,680,918 | A  | * | 10/1997 | Reik et al. | ...................... 192/55.1 |
| 6,648,117 | B2 | * | 11/2003 | Shoji et al. | .................. 192/55.61 |
| 6,868,949 | B2 | * | 3/2005 | Braford, Jr. | .................. 192/55.61 |
| 2005/0087420 | A1 | * | 4/2005 | Schafer et al. | ............. 192/55.61 |
| 2006/0266612 | A1 | * | 11/2006 | Gerlach | ...................... 192/48.91 |

FOREIGN PATENT DOCUMENTS

| DE | 102005030192 | 2/2006 |
| EP | 1203899 | 5/2002 |
| EP | 1519074 | 3/2005 |
| EP | 1548313 | 6/2005 |
| WO | 2007051627 | 5/2007 |

* cited by examiner

*Primary Examiner* — Richard M. Lorence
(74) *Attorney, Agent, or Firm* — Volpe and Koenig, P.C.

(57) ABSTRACT

A clutch unit (1) including at least one wet clutch (28, 29) and a torsional vibration damper (12) which are accommodated in a housing (8) driven by the drive unit. In order to simplify assembly, pre-assembled modular units (3, 4, 5) are formed that are joined together during the final assembly process. Advantageously, a separation point is provided between two modular units in the torsional vibration damper, wherein one modular unit (3) includes the energy accumulators (11) captively accommodated in a housing part (6), while the other modular unit (4) includes the output part of the torsional vibration damper as an input part (13) of the at least one wet clutch.

13 Claims, 2 Drawing Sheets

CLUTCH UNIT COMPRISING A TORSIONAL VIBRATION DAMPER

CROSS-REFERENCE TO RELATED APPLICATIONS

This application is a continuation of International Application No. PCT/DE2009/001806, filed Dec. 22, 2009, which claims the benefit of German Patent Application No. 10 2009 005 076.0, filed Jan. 19, 2009, both of which are incorporated herein by reference as if fully set forth.

BACKGROUND

The invention relates to a clutch unit comprising at least one wet clutch and one torsional vibration damper that are accommodated in a housing driven by a drive unit.

Such clutch units have become known, for example, from DE 10 2005 030 192 A1. Here, a torsional vibration damper is arranged within the housing of a friction clutch with wet operation. Here, a housing part is equipped with the individual components and then connected, for example, welded tightly, to a second housing part, for example. Especially for clutch units with two wet clutches arranged one above the other in the radial direction and forming a double clutch, the number of components to be used increases, so that these can be accommodated in one housing part only with great effort. Especially during series production, long cycle times are required in the final assembly for this purpose.

SUMMARY

Therefore, the objective is to provide a clutch unit that is assembled from individual, pre-assembled components during the final assembly.

This objective is met by a clutch unit for a drive train with a drive unit and a subsequently arranged transmission with at least one wet clutch arranged in a housing that is driven by the drive unit and is formed from two housing parts connected at the outer periphery during the mounting of the clutch unit and a torsional vibration damper arranged between the housing and an input part of the at least one wet clutch with energy storage devices that are distributed across the periphery and charged, on one side, in the peripheral direction by the housing and, on the other side, by the input part, wherein the energy storage devices are captively accommodated in one of the housing parts before the joining of the housing parts and the at least one wet clutch is mounted before the joining of the housing parts. In this way, essentially three components are produced including the housing part facing the drive unit with the energy storage devices, the at least one wet clutch, and the housing part facing the transmission. The arrangement is here advantageously separated on the torsional vibration damper that could be constructed as a two-mass flywheel, wherein the two housing parts form the primary flywheel mass and the at least one wet clutch forms the second flywheel mass. Accordingly, the input part of the torsional vibration damper is the housing itself, while the output part of the torsional vibration damper is simultaneously the input part of the at least one wet clutch. The torsional vibration damper could have a one-stage or multiple-stage construction, wherein, for a relative rotation of the housing and at least one wet clutch relative to each other, the energy storage devices that are active in the peripheral direction are each acted upon by catches provided on the housing and on the input part and thus damp torsional vibrations. The energy storage devices are preferably constructed as bow springs extending across a wide angle of the periphery of the housing, wherein preferably two bow spring groups can be provided distributed across the periphery, with each of these groups being able to be formed from two bow springs nested one inside the other in the radial direction. Furthermore, a torsional vibration absorber, for example, a centrifugal force pendulum, could be connected in parallel to the torsional vibration damper, wherein its flyweights could be provided adjacent in the axial direction and at a similar height of the energy storage devices in the radial direction.

The captive accommodation of the energy storage devices can be realized through axial placement of these devices on a housing wall of the housing part facing the drive unit, wherein the energy storage devices are fixed in the axial direction by a ring washer part spaced apart in the axial direction from the housing wall and connected on the outside in the radial direction to the housing. The ring washer part could be placed on a radial projection after the placement of the energy storage devices in the housing part, wherein an anti-wear lining could be provided in the radial direction between the housing and the energy storage device and then can be fixed on the projection from the outside, in that, for example, the ring washer part and housing are welded with each other. The ring washer part here supports the energy storage devices against axial deflection during the operation of the torsional vibration damper. To this end, for example, in a construction of the energy storage devices as bow springs, for keeping the structural space on the inside free in the radial direction, a radial extension of the ring washer part up to half the winding diameter of the bow springs is sufficient. The ring washer part could be mapped at least partially to the periphery of the windings in the region of a contact face with the bow springs.

For the construction of the housing-side catches for the energy storage devices, stamped sections that apply a force on the end faces of the energy storage devices, such as bow springs, in the peripheral direction could be provided in the housing. Alternatively or additionally, the ring washer part could have catches that are exposed on the same periphery and are turned over essentially in the axial direction relative to the axis of rotation and thus engage in the axial direction between two ends of the energy storage device and apply a force on these in the peripheral direction.

The output-side catches of the torsional vibration damper are provided on the input part of the at least one wet clutch, wherein this has a flange part with catches extending outward in the radial direction for the energy storage device. These output-side catches are aligned, in operation, with the input-side, that is, housing-side catches. In order to achieve a corresponding orientation of the catches relative to each other in the peripheral direction during the mounting, corresponding positioning aids could be provided between the housing and the at least one wet clutch, wherein these positioning aids can alternatively or additionally be used as a centering aid until the clutch unit is accommodated on one or two transmission input shafts of the transmission.

The flange part with its arms constructed as catches extended in the radial direction advantageously has, on the outer periphery, a smaller diameter than the inner periphery of the ring washer part. In this way, the two components could be placed one inside the other in a simple way, because the flange part and ring washer part can engage one above the other in the axial direction during the assembly. In other embodiments it can be provided that the catches have a greater outer diameter than the inner diameter of the ring washer part, wherein the catches turned over in the axial direction of the ring washer part have a larger diameter than the outer diameter of the catches of the flange part. If the catches of the flange part enclose a smaller circular segment than the catches of the ring washer part, the ring washer part and flange part can likewise be brought past each other in the axial direction during assembly. Advantageously, the radial circular segments of the catches are approximately equal under consideration of production tolerances, so that passage is still just possible, without putting up with a noticeable rotational play without charging the energy storage devices. It is understood that for the construction of special embodiments, such a rotational play could be provided in that the circular segment-shaped extension of the catches of the flange part could be less than that of the catches of the ring washer part, especially when, in this angular region, a second damper stage should be effective. Furthermore, between the housing and the at least one wet clutch, a friction mechanism could be arranged that could be provided, for example, by the positioning or centering aids.

According to the inventive concept, the clutch unit can contain a double clutch with two wet clutches arranged one above the other in the radial direction, wherein torque is transmitted to both wet clutches via the input part. The two wet clutches are each acted upon separately by a hydraulic piston and have a hub that meshes with one of two transmission input shafts of the transmission. The pistons for activating the wet clutches, as well as the input part on which the torsional vibration absorber could also be accommodated, can be supported on a central clutch hub. The output parts of the clutches here form washer parts that could be arranged relative to each other in the axial direction and spaced apart in the axial direction from the housing wall running in the radial direction of the drive-side housing part. The spacing of the parts rotating with different rotational speeds is realized advantageously by axial bearings, for example, needle bearings. If such a clutch unit is equipped with only one wet clutch, then the configuration reduces to a hub with a washer part spaced apart in the axial direction from the housing wall.

The accommodation of the at least one wet clutch is realized on the clutch hub, wherein this is supported in a floating manner in the axial direction between the two housing parts or between a housing part and the transmission housing against the effect of energy storage devices active in the axial direction. To this end, at least one of the energy storage devices active in the axial direction could be a thrust washer. To this end, it has proven advantageous when the energy storage devices active in the axial direction or the thrust washers are produced as shim washers, corrugated rings, or disks corrugated across the periphery. These could be prevented from rotating in that these are fixed in the peripheral direction, for example, by external or internal teeth on an adjacent component and therefore rapid wear can be prevented.

One advantageous embodiment of a clutch unit with two wet clutches provides that the clutch hub is supported in the axial direction by an end face relative to a hub of an output part, such as a washer part of a first wet clutch that is supported so that it can rotate in the axial direction on a second hub of an output part, such as a washer part of a second wet clutch, wherein this is supported, in turn, on the housing part, such as the housing wall, facing the drive side.

Advantageously, the cooling of the at least one wet clutch can be performed by a cooling circuit, wherein pressurized medium is fed into the housing from the inside in the radial direction, for example, via the clutch hub, guided over the friction coating of the at least one wet clutch, and discharged again by a stationary suction pipe. It has proven especially advantageous to use the suction pipe accommodated rigidly on the transmission housing as an axial thrust point for the clutch hub. To this end, a thrust washer that is elastic in the axial direction could be provided between the suction pipe and the clutch hub and/or between the suction pipe and the transmission housing.

One advantageous embodiment provides a first component including a drive-side housing part and energy storage devices accommodated captively therein of the torsional vibration damper, a second component including two wet clutches that are arranged one above the other in the radial direction and are accommodated on a clutch hub and a third component connected on the outside in the radial direction to the first component after a centered accommodation of the second component in the first component with the transmission-side housing part. Here, on the third component on an axial projection provided on the inner periphery of the transmission-side housing, a drive for a pump could be provided and adjacent to this drive in the axial direction, a support for the clutch unit could be provided on a transmission housing. Alternatively, the drive for the pump could be pre-assembled using a rolling bearing on the transmission housing, wherein, during the mounting of the clutch unit on the transmission, a positive fit is formed between the housing, for example, the axial projection, and the pump drive in the peripheral direction, so that the housing drives the pump drive independent of the operating state of the at least one wet clutch. Here, the housing could be centered on the pump drive, so that this is likewise supported on the transmission housing so that it can rotate. Furthermore, the suction pipe could be accommodated with its fixation and pressurized medium passage lines on the third component.

BRIEF DESCRIPTION OF THE DRAWINGS

The invention will be explained in detail with reference to the embodiments shown in FIGS. 1 and 2. Shown herein are.

DETAILED DESCRIPTION OF THE PREFERRED EMBODIMENTS

Figure 1:
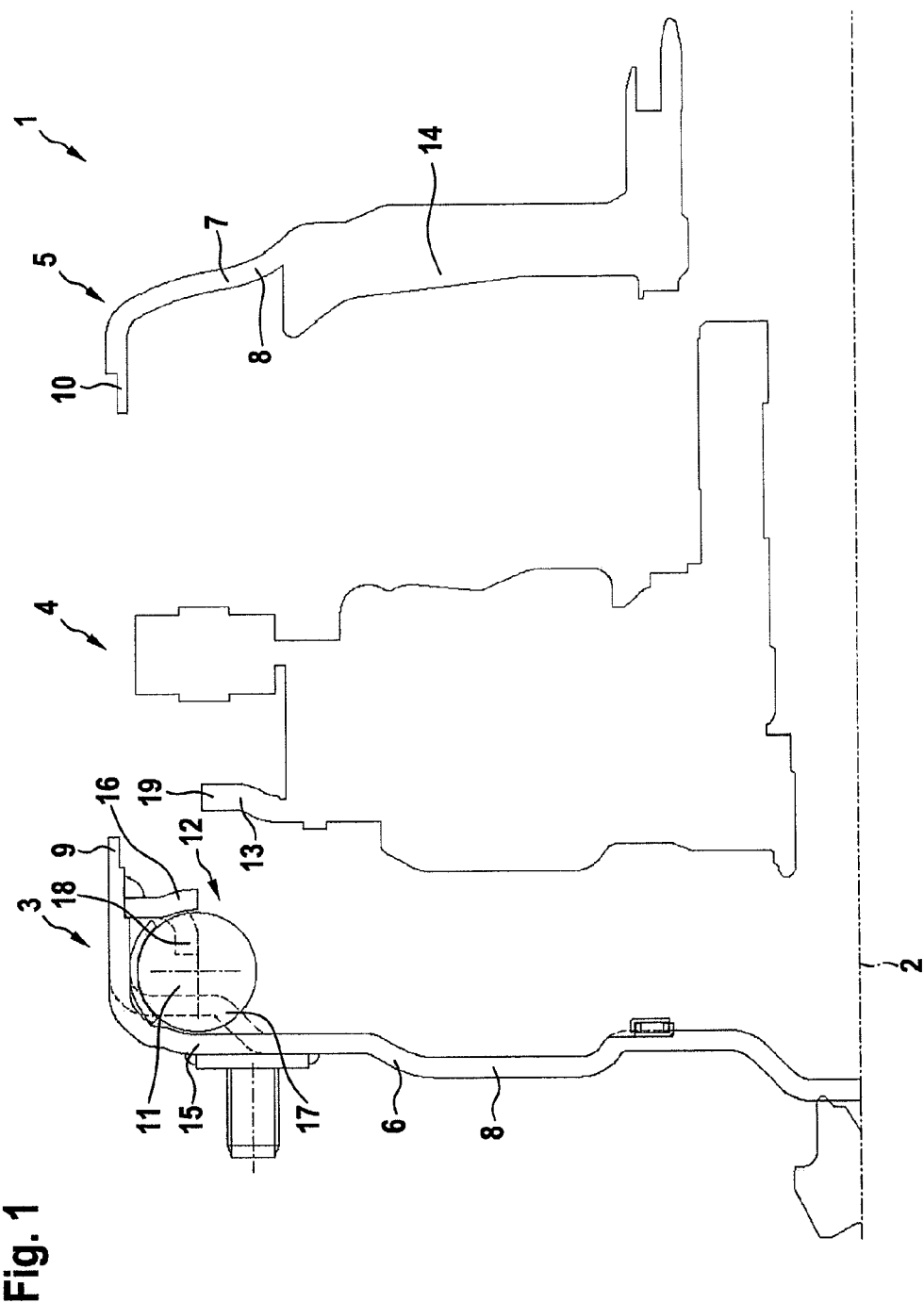
FIG. 1 is a schematic diagram of the components of a clutch unit in partial section.

FIG. 1 shows the clutch unit 1 arranged about the axis of rotation 2 in the state before the final assembly, wherein only the outlines of the three components 3, 4, 5 are shown. The two components 3, 5 here contain the housing parts 6, 7 that form the housing 8 of the clutch unit 1 and are connected tightly to each other, such as, for example, welded on the outside in the radial direction on the peripheries 9, 10 that overlap in the axial direction after the final assembly. The component 3 contains the energy storage devices 11 of the torsional vibration damper 12 and is connected locked in rotation with the not-shown drive unit, for example, of an internal combustion engine, such as a diesel or Otto engine. For the captive arrangement of the energy storage devices 11 and for preventing deflection during operation, these are fixed in the axial direction between the housing wall 15 and the ring flange part 16. The input-side catches 17, 18 are here exposed by stamped sections in the housing wall 15 or from the ring flange part 16. The output-side catches 19 of the input part 13 of the wet clutches arranged on the component 4, wherein this input part is simultaneously used as the output part for the torsional vibration damper 12 and applies a force in the radial direction on the energy storage devices 11 via the catches 19 are bounded in the radial direction so that, while maintaining an assembly play, the catches 19 can be brought past when inserting the component 4 on the ring flange part 16. To this end, the inner diameter of the ring flange part 16 is likewise bounded inwardly in the radial direction to half the diameter of the windings of the energy storage devices 11, so that both the input-side and also the output-side catches obtain a sufficient overlap with the end faces of the energy storage devices 11.

The component contains the housing part 7 and also the suction pipe 14 that is coupled in a fixed manner with the not-shown transmission housing after the joining of the components 3, 4, 5.

Figure 2:
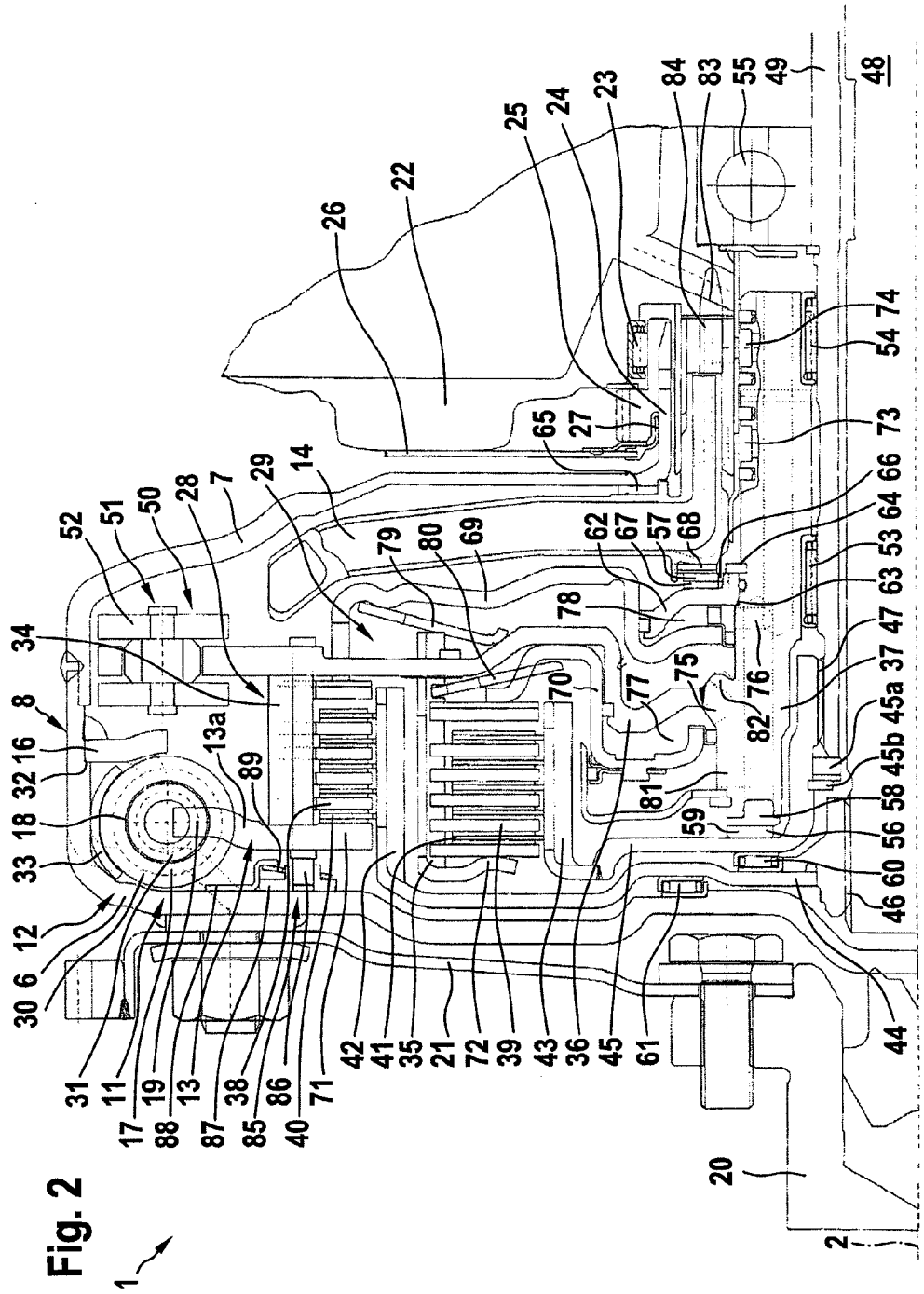
FIG. 2 is a partial section view through the clutch unit of FIG. 1 in the assembled state.

FIG. 2 shows the clutch unit 1 in the assembled state as a partial section above the axis of rotation 2. The clutch unit 1 is arranged between the drive unit, wherein only the crankshaft 20 of this drive unit is shown, and the transmission, wherein only the transmission housing 22 of this transmission is shown. The housing 8 of the clutch unit 1 is accommodated on the crankshaft 20 by a drive plate 21, such as a flexplate that is flexible in the axial direction and compensates axial vibrations and wobble vibrations of the crankshaft 20 and is driven thereby.

Furthermore, the housing 8 is supported on the transmission housing 22 so that it can rotate by the roller bearing 23, wherein the crown gear 25 for the transmission oil pump that can also circulate the pressurized medium of the clutch unit 1 is arranged between the ring-shaped axial projection 24 of the housing part 7 and the roller bearing 23 and is driven by the projection 24. The pump drive formed from the crown gear 25 and the roller bearing 23 that also forms, above the crown gear 25, a support for the housing 8 on the housing wall of the transmission housing 22 is pre-assembled advantageously on the transmission housing 22, wherein, for the connection of the clutch unit 1 and transmission, the suction pipe 14 is centered in the feed mechanism and the guide pins 83 pass through this mechanism and are displaced in the axial direction in the transmission housing 22 and the suction pipe 14 is supported locked in rotation. Sealing washer 26 that is centered on the axial projection 24 and is made, for example, from sheet metal or plastic is provided with a seal 27, such as a radial shaft sealing ring for the projection 24, for sealing the housing 8 relative to the transmission housing 22.

Within the housing 8 filled at least partially with pressurized medium, the torsional vibration damper 12 and the two wet clutches 28, 29 arranged one above the other in the radial direction are accommodated. The input part of the torsional vibration damper 12 is here formed by the housing that applies a force in the peripheral direction on the energy storage devices 11 that are active in the peripheral direction and are formed, in the shown embodiment, from advantageously two bow-spring groups arranged across the periphery each with two bow springs 30, 31 nested one inside the other in the radial direction, by the catches 17, 18 engaging in the radial direction in the ends of the bow springs 30, 31. The catches 17 are here formed from deformations of the housing part 6 arranged across the periphery and the catches 18 are formed by exposed regions of the annular flange part 16. The annular flange part 16 is placed on the radial projection 32 of the housing part 6 after placement of the bow springs 30, 31 and fixed in the axial direction, for example, welded, and are used for the captive accommodation of the bow springs 30, 31 before assembly and the axial guidance of the bow springs 30, 31 during operation. Between the bow springs 30 and the outer region of the housing part 6 in the radial direction, an anti-wear lining 33 is provided, which is arranged in two parts in the peripheral direction between the catches 17 and can be supported floating relative to the housing 8.

The torsional vibration damper 12 is active in the torque flow path before the wet clutches 28, 29, so that the output part of the torsional vibration damper 12 is simultaneously the joint input part 13 of the wet clutches 28, 29. To this end, the input part 13 provides a flange part 13*a* with the output-side catches 19 of the torsional vibration damper 12, which are constructed as arms extended in the radial direction of the flange part 13*a* and apply a force on the end faces of the bow springs 30, 31 in the non-tensioned state of the bow springs 30, 31 on the same periphery of the catches 17, 18 and thus cause a tensioning of the bow springs 30, 31 for a relative rotation of the housing 8 relative to the input part 13 of the wet clutches 28, 29, so that the torque spikes causing such relative rotations are damped, in that the bow springs active as energy storage devices 11 temporarily buffer the energy of these torque spikes.

Through the use of the torsional vibration damper 12, the torque of the drive unit is registered in the input part 13. The input part 13 distributes the torque onto the input-side plate carriers 34, 35 of the wet clutches 28, 29 that are centered and supported by a common carrier disk 36 that is connected rigidly, such as welded, to the clutch hub 37. A centrifugal force pendulum 51 with flyweights 52 that can be displaced to a limited extent relative to the carrier disk 36 in the peripheral direction and radial direction is arranged on the carrier disk 36 of the torsional vibration absorber 50, for example—as shown—outside in the radial direction and advantageously spaced apart in the axial direction and at the same height in the radial direction. In the input-side plate carriers 34, 35, plates 38, 39 are suspended that alternate in the axial direction with output-side friction plates 40, 41 and form a friction fit when an axial force is applied. The output-side friction plates 40, 41 are suspended in plate carriers 42, 43 that are each connected, such as, welded, to a hub 44, 45 with teeth 46, 47 to engage with the transmission input shaft 48 or with the transmission input shaft 49 arranged around this shaft and constructed as a hollow shaft, and are therefore supported and centered on the two transmission input shafts 48, 49.

In the uninstalled state of the clutch unit 1, the two wet clutches 28, 29 are equipped with the clutch hub 37 as component 4 (FIG. 1). After installation, the clutch hub 37 is supported floating in the axial direction by the roller bearings 53, 54 on the transmission input shaft 49. The transmission input shaft 49 is supported in the axial direction by the roller bearing 55 and fixed in the radial direction in the transmission housing 22.

The floating support of the clutch hub 37 is limited by the two thrust washers 56, 57. The thrust washer 56 is formed in one part from plastic and contains the carrier part 58 introduced into the end side of the clutch hub 37 and the lubricating oil grooves 59. The hub 45 is applied in the axial direction and so that it can rotate relative to the hub 44 by the roller bearing 60. The hub 44 is supported by the roller bearing 61 fixed in the axial direction so that it can rotate on the housing part 6, so that the clutch hub 37 is supported in the axial direction by the shim washer 67, in that, for example, a defined play is set by these parts. The axial biasing necessary for the bearings 60, 61 is set by the energy storage device 45*a* active in the axial direction, for example, a corrugated spring that is itself supported on the transmission input shaft 49 by the locking washer 45*b*. In the opposite direction, the clutch hub 37 is supported by the sealing plate 62 that is arranged fixed on the projection 63 in the axial direction by the locking ring 64, on the suction pipe 14 that is, in turn, supported in the axial direction by the thrust washer 65 that could be constructed as a roller bearing on the housing part 7. Between the sealing plate 62 and the suction pipe 14, the thrust washer 57 is arranged that is active in the axial direction and makes possible a displacement that is limited in the axial direction of the clutch hub 37 against its effect in the direction of the housing part 7, so that the clutch hub 37 can be displaced to a limited extent in both axial directions, can be displaced relative to the housing 8, and is therefore supported in a floating manner. The thrust washer 57 is formed from a carrier disk 66 meshed with the sealing plate 62 and a shim washer 67 that is accommodated rigidly on this carrier disk and comes in contact with a thrust washer 68 meshed with the suction pipe 14.

The two wet clutches 28, 29 are charged by pistons 69, 70 that can be displaced in the axial direction by pressurized medium to press the plates 38 and 39, respectively, in the axial direction with the friction plates 40 and 41, respectively, against an end plate 71, 72 and therefore form a friction fit. To this end, the pressurized medium is led via rotating bushings 73, 74 into supply lines 75, 76 and dosed into the pressure chambers 77, 78, wherein the pistons 69, 70 are displaced against the effect of the energy storage devices 79, 80 active in the axial direction and the wet clutches 28, 29 are each therefore closed according to the applied pressure of the pressurized medium. If the pressure in the pressure chambers 77, 78 dissipates, the wet clutches are automatically opened again by the release of tension by the energy storage devices 79, 80. The supply lines 81, 82 are used for cooling the wet clutches 28, 29, in particular, the friction linings of the friction plates 40, 41 that are exposed to particular heat stress especially under slipping conditions of the wet clutches 28, 29. The pressurized medium dosed in this way cools the friction plates 40, 41 and flows outward in the radial direction, from where it is siphoned by the suction pipe 14 connected rigidly to the transmission housing 22 by the guide pins 83 and is fed to the transmission pan via the discharge line 84.

A friction mechanism 85 can be provided between the torsional vibration damper 12 and the input part 13 of the wet clutches 28, 29. To this end, a friction ring 87 that is centered by the retaining ring 88 mounted on the housing part 6 and is biased relative to this by the energy storage device 89 that is active in the axial direction and can be, for example, as shown, a plate spring, can be charged by pins 86 of the plate carrier 34, wherein these pins are raised in the axial direction and are distributed across the periphery. Additionally or alternatively, the friction mechanism 85 could be used as a centering mechanism of the two wet clutches 28, 29 in the housing 8 before the final assembly as long as this is not yet centered on the transmission input shaft 49.

LIST OF REFERENCE SYMBOLS

1 Clutch unit
2 Axis of rotation
3 Component
4 Component
5 Component
6 Housing part
7 Housing part
8 Housing
9 Periphery
10 Periphery
11 Energy storage device
12 Torsional vibration damper
13 Input part
13a Flange part
14 Suction pipe
15 Housing wall
16 Ring flange part
17 Catch
18 Catch
19 Catch
20 Crankshaft
21 Drive plate
22 Transmission housing
23 Roller bearing
24 Axial projection
25 Crown gear
26 Sealing washer
27 Seal
28 Wet clutch
29 Wet clutch
30 Bow spring
31 Bow spring
32 Projection
33 Anti-wear lining
34 Plate carrier
35 Plate carrier
36 Carrier disk
37 Clutch hub
38 Plate
39 Plate
40 Friction plate
41 Friction plate
42 Plate carrier
43 Plate carrier
44 Hub
45 Hub
45a Energy storage device
45b Locking washer
46 Teeth
47 Teeth
48 Transmission input shaft
49 Transmission input shaft
50 Torsional vibration absorber
51 Centrifugal force pendulum
52 Flyweight
53 Roller bearing
54 Roller bearing
55 Roller bearing
56 Thrust washer
57 Thrust washer
58 Carrier part
59 Lubricating oil groove
60 Roller bearing
61 Roller bearing
62 Sealing plate
63 Projection
64 Locking ring
65 Thrust washer
66 Carrier part
67 Shim washer
68 Thrust washer
69 Piston
70 Piston
71 End plate
72 End plate
73 Rotating bushing
74 Rotating bushing
75 Supply line
76 Supply line
77 Compression chamber
78 Compression chamber
79 Energy storage device
80 Energy storage device
81 Supply line
82 Supply line
83 Guide pin
84 Discharge line 85 Friction mechanism
86 Pin
87 Friction ring
88 Retaining ring
89 Energy storage device

The invention claimed is:

1. A clutch unit (1) for a drive train with a drive unit and a subsequently arranged transmission, the clutch unit comprising at least one wet clutch (28, 29) arranged in a housing (8) that is driven by the drive unit and is formed from two housing parts (6, 7) joined at an outer periphery thereof during assembly of the clutch unit (1), and a torsional vibration damper (12) arranged between the housing (8) and an input part (13) of the at least one wet clutch (28, 29) having energy storage devices (11) that are distributed across the periphery and are acted upon, on one side, in a peripheral direction by the housing (8) and, on the other side, by the input part (13), wherein the energy storage devices (11) are placed on a housing wall of one of the housing parts (6, 7) in an axial direction and are supported captively by a ring flange part (16) spaced apart in the axial direction from the housing wall and connected to the one of the housing parts (6, 7) on an outside in a radial direction, and before the housing parts (6, 7) are joined, the energy storage devices (11) are captively accommodated in the one of the housing parts (6, 7) and the at least one wet clutch (28, 29) is installed before the housing parts (6, 7) are joined.

2. The clutch unit (1) according to claim 1, wherein the ring flange part (16) has catches (18) exposed in the axial direction for the energy storage devices (11).

3. The clutch unit (1) according to claim 2, wherein the input part (13) has a flange part (13a) with catches (19) extending outward in the radial direction for the energy storage devices (11).

4. The clutch unit (1) according to claim 1, wherein the at least one wet clutch (28, 29) is accommodated on a clutch hub (37) that is suspended in an axial direction between the two housing parts (6, 7) against a biasing effect of thrust washers (56, 57).

5. The clutch unit (1) according to claim 4, wherein at least one of the thrust washers (56, 57) is produced from plastic.

6. The clutch unit (1) according to claim 5, wherein the thrust washer is a shim washer (67), a thrust washer with radial grooves (59), or a disk that is corrugated across a periphery thereof.

7. The clutch unit (1) according to claim 4, wherein the clutch hub (37) is supported in one direction on the housing part (6) facing the drive unit and in an opposite direction on the housing part (7) facing the transmission or on the transmission housing.

8. The clutch unit according to claim 7, wherein the clutch hub is supported in the axial direction by an end face relative to a hub of an output part of a first wet clutch that is supported, that can rotate about an axis on a second hub of an output part of a second wet clutch, that is supported, in turn, on the housing part facing the drive side.

9. The clutch unit (1) according to claim 7, wherein the clutch hub (37) is supported in the axial direction on a suction pipe (14) that is supported on the housing part (7) facing the transmission.

10. The clutch unit (1) according to claim 1, wherein a first component (3) includes a drive-side one of the housing parts (6) and the energy storage devices (11) of the torsional vibration damper (12), wherein the energy storage devices are accommodated captively therein, a second component (4) includes two wet clutches (28, 29) that are arranged one above the other in a radial direction and are accommodated on one clutch hub (37), and a third component (5) includes a transmission-side one of the housing parts (7), and the third component is connected on the outside in a radial direction to the first component (3) after a centered accommodation of the second component (4) in the first component (3).

11. The clutch unit (1) according to claim 10, wherein a drive for a pump is provided on the third component (5) on an axial projection (24) provided on an inner periphery of the transmission-side housing part (7) and, adjacent to the drive in the axial direction, a support for the clutch unit (1) is provided on a transmission housing (22).

12. Clutch unit (1) according to claim 11, wherein a suction pipe (14) is accommodated on the third component (5).

13. A clutch unit (1) for a drive train with a drive unit and a subsequently arranged transmission, the clutch unit comprising at least one wet clutch (28, 29) arranged in a housing (8) that is driven by the drive unit and is formed from two housing parts (6, 7) joined at an outer periphery thereof during assembly of the clutch unit (1), and a torsional vibration damper (12) arranged between the housing (8) and an input part (13) of the at least one wet clutch (28, 29) having energy storage devices (11) that are distributed across the periphery and are acted upon, on one side, in a peripheral direction by the housing (8) and, on the other side, by the input part (13), wherein the energy storage devices (11) are placed on a housing wall of one of the housing parts (6, 7) in an axial direction and are supported captively by a ring flange part (16) spaced apart in the axial direction from the housing wall and connected to the one of the housing parts (6, 7) on an outside in a radial direction, and before the housing parts (6, 7) are joined, the energy storage devices (11) are captively accommodated in the one of the housing parts (6, 7) and the at least one wet clutch (28, 29) is installed before the housing parts (6, 7) are joined, wherein the input part (13) has a flange part (13a) with catches (19) extending outward in the radial direction for the energy storage devices (11), wherein the ring flange part (16) has catches (18) exposed in the axial direction for the energy storage devices (11), wherein the input part (13) has a flange part (13a) with catches (19) extending outward in the radial direction for the energy storage devices (11), and wherein an outer periphery of the flange part (13a) has a smaller diameter than an inner periphery of the ring flange part (16).

* * * * *